H. Abbott,
Upsetting Tires,
Nº 13,775. Patented Nov. 13, 1855.
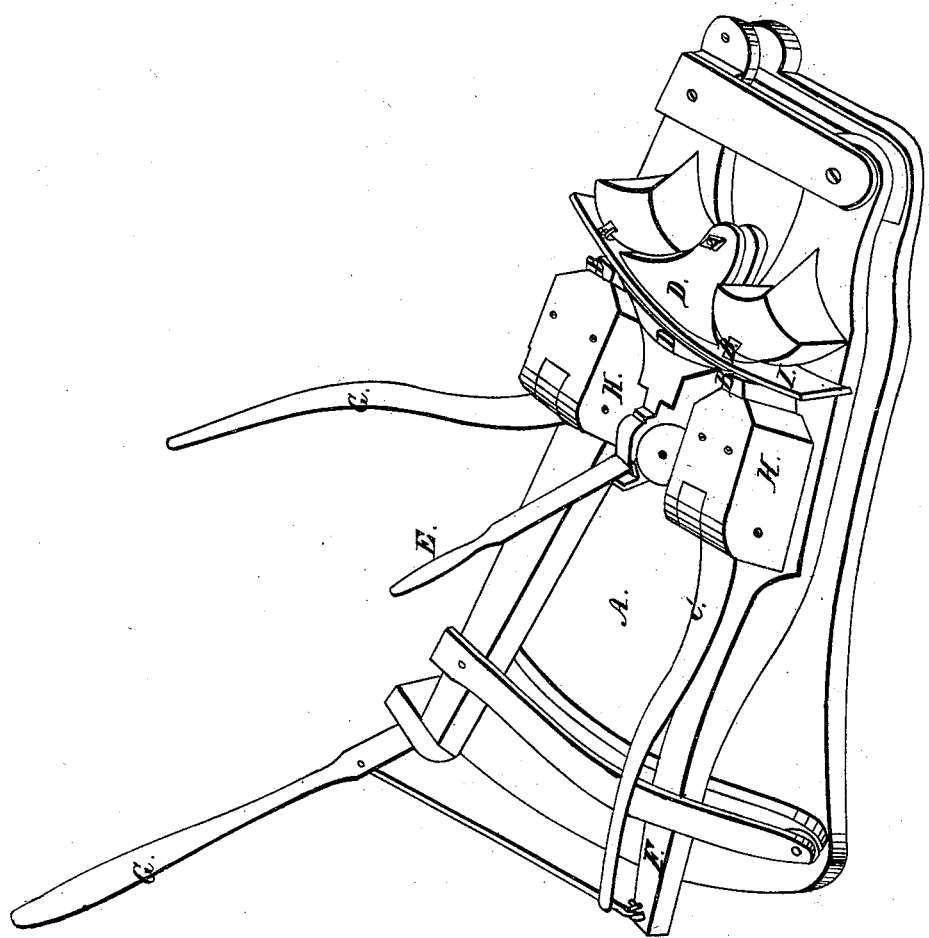

UNITED STATES PATENT OFFICE.

HIRAM ABBOTT, OF WAKEMAN, OHIO.

UPSETTING TIRES, &c.

Specification of Letters Patent No. 13,775, dated November 13, 1855.

*To all whom it may concern:*

Be it known that I, HIRAM ABBOTT, of the town of Wakeman, Huron county, State of Ohio, have invented a new and useful Improvement in Machines for Upsetting Iron or Contracting the Length of Iron Bars, Wagon-Tires, &c., and I do declare the following is a full description of the same, reference being had to the annexed drawing.

A, is a bed plate of cast iron or other material upon which the other parts of the machine are arranged and secured.

B, B, are adjustable jaws into which the iron bar, or wagon tire, or other article to be upset is placed, when the movable jaw is brought forward in contact with the iron bar (or other article) by means of two eccentric levers marked C, C, thereby holding the bar or tire firmly while the same is subjected to pressure in the direction of its length, by means of the levers to be described.

C, C, are two eccentric levers, the eccentric portion or end of which comes in contact with each of the movable jaws (above described) in such a manner as to throw each movable jaw forward toward the bar or tire, and in contact with it, when the levers are moved in the proper direction.

D, D, are each a single elongated jaw (about midway between the two pairs of jaws B, B,) which when brought to a proper distance from each other, form a slot (either curved or straight as may be desired) and into which slot the heated portion of the bar to be upset is placed, and which slot is intended to guide or control the bar of iron from bending while it is subjected to pressure in the direction of its length.

E, is an eccentric lever used to bring forward the movable elongated jaw, toward the corresponding stationary one, to form the desired width of the slot for the article about to be upset, this lever working in a similar manner to the levers C, C.

F, is a lever upon which (at a proper distance from the end or fulcrum) is attached one pair of the adjustable jaws B, B, already described. The long end of this lever is connected to another lever "G" by a rod, in order to obtain a sufficient amount of power without having the lever F too long for convenience, and also as the lever "G" is more readily acted upon, as it is worked by the operator while facing and quite near his work.

G, is a hand lever, which is connected to the lever F as above described, and which moves the lever F forward toward the center of the machine.

H, H, are two boxes or guides for the movable jaws B, B, (that is the movable jaw in each pair) to work in. These movable jaws may be simply a square or round piece of iron or steel of the required length, and are surrounded within the guides, with a spiral spring to throw the jaw back from its hold upon the iron when the bar of iron is to be released. The spiral springs are not shown in the drawings.

I, represents a curved bar of iron in process of being upset or contracted in its length by the operation of the machine.

The mode of operating the machine is as follows. The iron to be upset is heated for a short distance (usually in its thinnest or weakest part and the part thus heated is placed within the slot above described, (the jaws of the same, as well as the two pairs of adjustable jaws B B, having been thrown open by the receding action of the eccentric levers and the spiral springs.) The movable parts of the adjustable jaws are now forced down toward the other jaw, which secures the bar of iron firmly and prevents it from slipping or moving in the jaws. The movable elongated jaw is also brought forward toward the bar of iron by means of the eccentric lever E (in the same manner as the adjustable jaws C, C), being brought near enough to the stationary elongated jaw to form a slot of the desired width for the thickness of the bar of iron, taking care to leave a little space above the present thickness of the iron, to allow it to upset, or thicken, when the force is applied to press it together in the direction of its length. The hand lever marked "G" is moved forward, which being connected with the long end of the lever F (in the drawing) moves also the lever F in the direction of the center of the machine, causing the pair of adjustable jaws attached to the said lever F, to approach the other jaws B, on the other side of the machine, and the bar of iron being firmly secured in each pair of the adjustable jaws, and being guided and controlled by the slot in the middle, it is obvious that the heated and flexible portion of the iron within the slot must be pressed together in the the direction of its length, and upset, and the length thereof reduced.

In case the required amount of contraction is not obtained at the first time of moving up the lever F as above described, then the adjustable jaws on said lever F, are opened (by throwing back the eccentric lever and by the action of the spiral spring), the lever F moved back to its first position,—a new hold taken upon the iron bar by bringing down the movable jaw as before, and the lever F again moved forward (by the aid of the lever G) which process again shortens and upsets the iron bar, and this operation can be repeated with great rapidity and by once heating the iron.

This machine is peculiarly adapted to upsetting or reducing the length of iron axles for wagons and carriages, which have been made too long in the process of welding the two parts together. The advantage consists, in being able by the use of this machine to make the two axles of an exact length, and also of making them of any length required, without any injury to the same by pounding or hammering them on the end with a hammer.

This machine by its arrangement possesses the advantage of receiving the bars of iron to be upset, in a horizontal position thereby allowing bars of any length to be upset in it. It is also arranged as above described, so that any amount of additional force may be applied to the levers G, and, F, that may be desired, in case the article to be upset should be large or not sufficiently heated.

I do not claim to have discovered any new method of constructing levers, or adjustable jaws, or eccentric levers, or spiral springs or slots, but What I do claim as my invention and desire to secure by Letters Patent is—

The arrangement of the parts of my machine—to wit the bed plate A, the adjustable jaws B, B, (operated upon by the eccentric lever C, C, and spiral springs)—the eccentric levers c, c,—the elongated jaws D, D, (which form the slot as described, by being increased or diminished in width through the agency of the eccentric lever E, and the spiral spring) the levers F and G, and the eccentric lever E all as described.

HIRAM ABBOTT.

Witnesses:
  E. J. BUNCE,
  T. SPORE.